United States Patent
Hofmann et al.

(10) Patent No.: US 12,192,872 B2
(45) Date of Patent: Jan. 7, 2025

(54) METHODS AND DEVICES FOR RADIO COMMUNICATION

(71) Applicant: Robert Bosch GmbH, Stuttgart (DE)

(72) Inventors: Frank Hofmann, Hildesheim (DE); Khaled Shawky Hassan, Laatzen (DE); Kurt Eckert, Ditzingen (DE); Tobias Frye, Braunschweig (DE)

(73) Assignee: ROBERT BOSCH GMBH, Stuttgart (DE)

( * ) Notice: Subject to any disclaimer, the term of this patent is extended or adjusted under 35 U.S.C. 154(b) by 359 days.

(21) Appl. No.: 17/658,349

(22) Filed: Apr. 7, 2022

(65) Prior Publication Data

US 2022/0369088 A1 Nov. 17, 2022

(30) Foreign Application Priority Data

May 6, 2021 (EP) .................................... 21172538

(51) Int. Cl.
| H04W 4/90 | (2018.01) |
| H04L 43/10 | (2022.01) |
| H04W 4/46 | (2018.01) |
| H04W 24/10 | (2009.01) |

(52) U.S. Cl.
CPC ............... *H04W 4/90* (2018.02); *H04L 43/10* (2013.01); *H04W 4/46* (2018.02); *H04W 24/10* (2013.01)

(58) Field of Classification Search
CPC ... H04L 41/0816; H04L 43/10; H04L 67/125; H04W 24/10; H04W 4/40; H04W 4/46; H04W 4/90; H04W 92/18

USPC ........................................................ 455/216
See application file for complete search history.

(56) References Cited

U.S. PATENT DOCUMENTS

| 11,854,392 B2* | 12/2023 | Hofmann .......... H04W 28/0268 |
| 2012/0008506 A1 | 1/2012 | Astigarraga et al. |
| 2017/0268896 A1* | 9/2017 | Bai ..................... G01C 21/3484 |
| 2017/0287233 A1* | 10/2017 | Nix .......................... G08G 1/166 |
| 2018/0005254 A1* | 1/2018 | Bai ......................... B60W 10/00 |
| 2018/0069890 A1 | 3/2018 | Frank et al. |
| 2019/0357026 A1* | 11/2019 | Hwang .................. H04W 4/12 |
| 2020/0068405 A1* | 2/2020 | Stählin .................... H04W 4/40 |
| 2020/0225658 A1* | 7/2020 | Bangslund .............. B63B 79/40 |
| 2021/0089938 A1* | 3/2021 | Ariannezhad .... G08G 1/096775 |
| 2021/0266867 A1* | 8/2021 | Das ........................ H04W 72/02 |
| 2022/0007379 A1* | 1/2022 | Cao ....................... H04W 72/02 |
| 2022/0136846 A1* | 5/2022 | Bhorkar .................. H04W 8/20 701/411 |
| 2022/0358839 A1* | 11/2022 | Hofmann ................ H04W 4/40 |
| 2023/0067689 A1* | 3/2023 | Hwang ................. H04W 24/10 |

* cited by examiner

*Primary Examiner* — Tan H Trinh
(74) *Attorney, Agent, or Firm* — NORTON ROSE FULBRIGHT US LLP; Gerard A. Messina

(57) ABSTRACT

A method for an apparatus operating in a wireless communication network. The method includes transmitting a plurality of functional safety containers offset in time along with at least one associated functional safety indicator that indicates a relevance according to at least one safety integrity level, wherein at least one of the plurality of functional safety containers comprises data, especially V2x data that comprises at least one of a vehicle operating parameter and a roadway event, or industrial data that comprises a machine operating parameter, or building technology data that comprises building operational data.

21 Claims, 9 Drawing Sheets

METHODS AND DEVICES FOR RADIO COMMUNICATION

CROSS REFERENCE

The present application claims the benefit under 35 U.S.C. § 119 of European Patent Application No. EP 21 17 2538.7 filed on May 6, 2021, which is expressly incorporated herein by reference in its entirety.

FIELD

The present invention provides advances in radio communication, in particular between vehicles and other V2X communication entities.

SUMMARY

According to a first aspect of the present invention, a method for an apparatus operating in a wireless communication network is provided. In accordance with an example embodiment of the present invention, the method comprises: Transmitting a plurality of functional safety containers offset in time along with at least one associated functional safety indicator that indicates a relevance according to at least one safety integrity level, wherein at least one of the plurality of functional safety containers comprises data, especially V2x data that comprises at least one of a vehicle operating parameter and a roadway event, or industrial data that comprises a machine operating parameter, or building technology data that comprises building operational data.

Advantageously, the periodic or semi-periodic transmission of the functional safety indicator allows the receiving entity to handle data according to a safety integrity level. Early handle safety defense mechanisms at lower layers are enabled, where existing safety functions will have more early metrics to fail-safe and/or to enhance its defense mechanisms. A system is enabled with high reliability and is therefore appropriate to realize applications with functional safety needs. Moreover, data is not only handled safely, but also an evaluation of the channel tunneled between TX<->RX as a safe communication is provided.

According to an advantageous example embodiment of the present invention, the transmission of the plurality of functional safety containers and the plurality of associated functional safety indicators causes a receiving apparatus to decide, at least based on a plurality of reception times associated with the plurality of functional safety indicators, whether the received data qualify to be processed according to at least one functional safety integrity level.

For example, a receiver identifies early in processing potentially SIL-relevant V2X data or at least one functional safety container by decoding a functional safety indicator at an expectation time-frequency position in the received L1 control channels and/or L2 control channels. Where, if the FSF exists and contains a corresponding value, the signal indicates a functional safety transmission and a functional safe heartbeat signaling. Moreover, the reception of the functional safety indicator indicates one or more configured transmission relevant to functional safety and triggers monitoring, measurements, analysis of the communication that is relevant for functional safety.

According to an advantageous example embodiment of the present invention, the method comprises: determining, based on the at least one safety integrity level or based on at least one functional safety level indicator or based on the at least one functional safety indicator, at least one communication requirement, in particular a periodicity of a transmission of the functional safety indicator, a minimum time period between subsequent transmissions of the functional safety indicator, or a maximum time period between subsequent transmissions of the functional safety indicator; and wherein the transmitting of the plurality of functional safety containers and the plurality of associated functional safety indicators is initiated according to the determined at least one communication requirement.

The transmission of the functional safety container uses the transmission requirements associated with the at least one safety indicator or, in particular based on a functional safety level indicator. The functional safety level indicator can provide, for example, the communication requirements from a look-up table. message or is preconfigured.

According to an advantageous example embodiment of the present invention, a further indicator is transmitted along with the data indicating an SIL-relevance of the data.

For example, if V2X data is marked by the further indicator as not safety relevant, then it is excluded from the decision to qualify to be processed as safety relevant. Advantageously, the functional safety containers are able to convey non-safety relevant data, therefore increasing overall transmission capacity.

Advantageously, the safety containers can convey data that is not relevant for functional safety, therefore increasing transport capacity. On the other hand, the container can be empty, but is available for transporting safety relevant information in a subsequent transmission opportunity.

According to an advantageous example embodiment of the present invention, the method comprises: mapping a higher-layer functional safety level indicator that is associated with the data, to the functional safety indicator.

Advantageously, the mapping provides sufficient granularity for lower-layer monitoring functions regarding functional safety, in particular on the receiver side. On the other hand, the configuration overhead for configuring the lower-layer functional safety assisting functions can be reduced.

According to an advantageous example embodiment of the present invention, the functional safety indicator has a smaller available range of values than the higher-layer functional safety level indicator.

Advantageously, the lower-layers are conveying the functional safety indicator that is consuming less data capacity than the higher-layer functional safety indicator.

According to an advantageous example embodiment of the present invention, the method comprises: receiving at least one communication failure message indicating a failure associated with the transmission of at least one of the plurality of functional safety containers and/or associated with the transmission of the at least one of the plurality of functional safety indicators.

Advantageously, the communication failure message provides means for the transmitting entity to react.

According to an advantageous example embodiment of the present invention, the method comprises: providing, upon receiving the at least one communication failure message, a reaction indicator indicating an execution of a fail-safe function.

Advantageously, the provided reaction indicator enables the transmitter or the associated entity to go into a fail-safe state via the fail-safe function.

According to an advantageous example embodiment of the present invention, the transmission of the plurality of functional safety indicators is conducted via at least one physical control channel, in particular via at least one of a Physical Uplink Control Channel, PUCCH, a Physical Downlink Control Channel, PDCCH, and a Physical Sidelink Control Channel PSCCH; or the transmission of the plurality of functional safety indicators is conducted via a respective MAC-CE, Medium Access Control-Control Element.

Advantageously, the physical control channel or MAC-CE allows an early assessment of the relevance of received data for functional safety.

According to a second aspect of the present invention, an apparatus is provided. In accordance with an example embodiment of the present invention, the apparatus comprises: transmitting means to transmit a plurality of functional safety containers offset in time along with at least one associated functional safety indicator that indicates a relevance according to at least one safety integrity level, wherein at least one of the plurality of functional safety containers comprises data, especially V2x data that comprises at least one of a vehicle operating parameter and a roadway event, or industrial data that comprises a machine operating parameter, or building technology data that comprises building operational data.

According of a third aspect of the present invention, a method for an apparatus operating in a wireless communication network is provided. In accordance with an example embodiment of the present invention, the method comprises: receiving a plurality of functional safety containers offset in time along with at least one associated functional safety indicator that indicates a relevance according to at least one safety integrity level, wherein at least one of the plurality of functional safety containers comprises data, especially V2X data that comprises at least one of a vehicle operating parameter, and a roadway event, or industrial data that comprises a machine operating parameter, or building technology data that comprises building operational data, and deciding, at least based on a plurality of reception times associated with the plurality of functional safety indicators, whether the received data qualify to be processed according to at least one safety integrity level.

For example, a receiver identifies early in processing potentially SIL relevant V2X data or at least one functional safety container by decoding the functional safety indicator at an expectation time-frequency position in the received L1 control channels and/or L2 control channels. Where, if the FSF exists and contains a corresponding value, the signal indicates a functional safety transmission. Moreover, the reception of the functional safety indicator indicates one or more configured transmission relevant to functional safety and triggers monitoring, measurements, analysis of the communication that is relevant for functional safety.

According to an advantageous example embodiment of the present invention, a further indicator is transmitted along with the data indicating a SIL-relevance of the data, wherein data, which is marked by the further indicator as not SIL-relevant, is excluded from the decision.

Advantageously, the functional safety containers are able to convey non-SIL-relevant data, therefore increasing overall transmission capacity.

According to an advantageous example embodiment of the present invention, the decision is made based on whether at least one monitored communication parameter associated with the reception times, matches a communication requirement that is associated with the at least one monitored communication parameter.

Advantageously, the lower communication layers provide possible functional safety data encapsulating FSI to the higher part of layer 2. The encapsulated FSI level assists the receiver lower layer to identify the parameters for the received FSF repetitive transmission (heartbeat), especially periodicity, irregularities, required failure threshold/rate, etc.

Advantageously, the lower communication layers provide affirmative assistance for higher layers handling functional safety. Passing the encapsulated FSI level to higher layer assists the receiver to interpret the possible reaction to a common event functional safety level, risk, hazard, etc.

According to an advantageous example embodiment of the present invention, the method comprises: determining a reaction indicator indicating an execution of a fail-safe function, if the at least one monitored communication parameter does not match the communication requirement.

Advantageously, lower-layer malfunctioning handling is enabled by comparing the communication requirement with the monitored communication parameter. Early reaction, for example by triggering a fail-safe function is enabled. Monitoring transmission, performing measurements, conduct analysis in lower layer shall identify faults and generate reports for higher layers in the form of the reaction indicator. Advantageously, the receiver entity will enter a fail-safe state based on lower layer monitoring of the communication parameters.

According to an advantageous example embodiment of the present invention, the method comprises: transmitting a communication failure message indicating a failure in communication, if the at least one monitored communication parameter does not match the determined communication requirement.

Advantageously, the transmitter of the plurality of safety containers is informed and can react to the detected failure.

Advantageously, the mapping provides sufficient granularity for lower-layer monitoring functions regarding functional safety, in particular on the receiver side. On the other hand, the configuration overhead for configuring the lower-layer functional safety assisting functions can be reduced.

According to a fourth aspect of the present invention, an apparatus is provided. In accordance with an example embodiment of the present invention, the apparatus comprises: receiving means to receive a plurality of functional safety containers offset in time along with at least one associated functional safety indicator that indicates a relevance according to at least one safety integrity level, wherein at least one of the plurality of functional safety containers comprises data, especially V2X data that comprises at least one of a vehicle operating parameter, and a roadway event, or industrial data that comprises a machine operating parameter, or building technology data that comprises building operational data; and decision means to decide, at least based on a plurality of reception times associated with the plurality of functional safety indicators, whether the received data qualify to be processed according to at least one safety integrity level.

DETAILED DESCRIPTION OF EXAMPLE EMBODIMENTS

Figure 1:
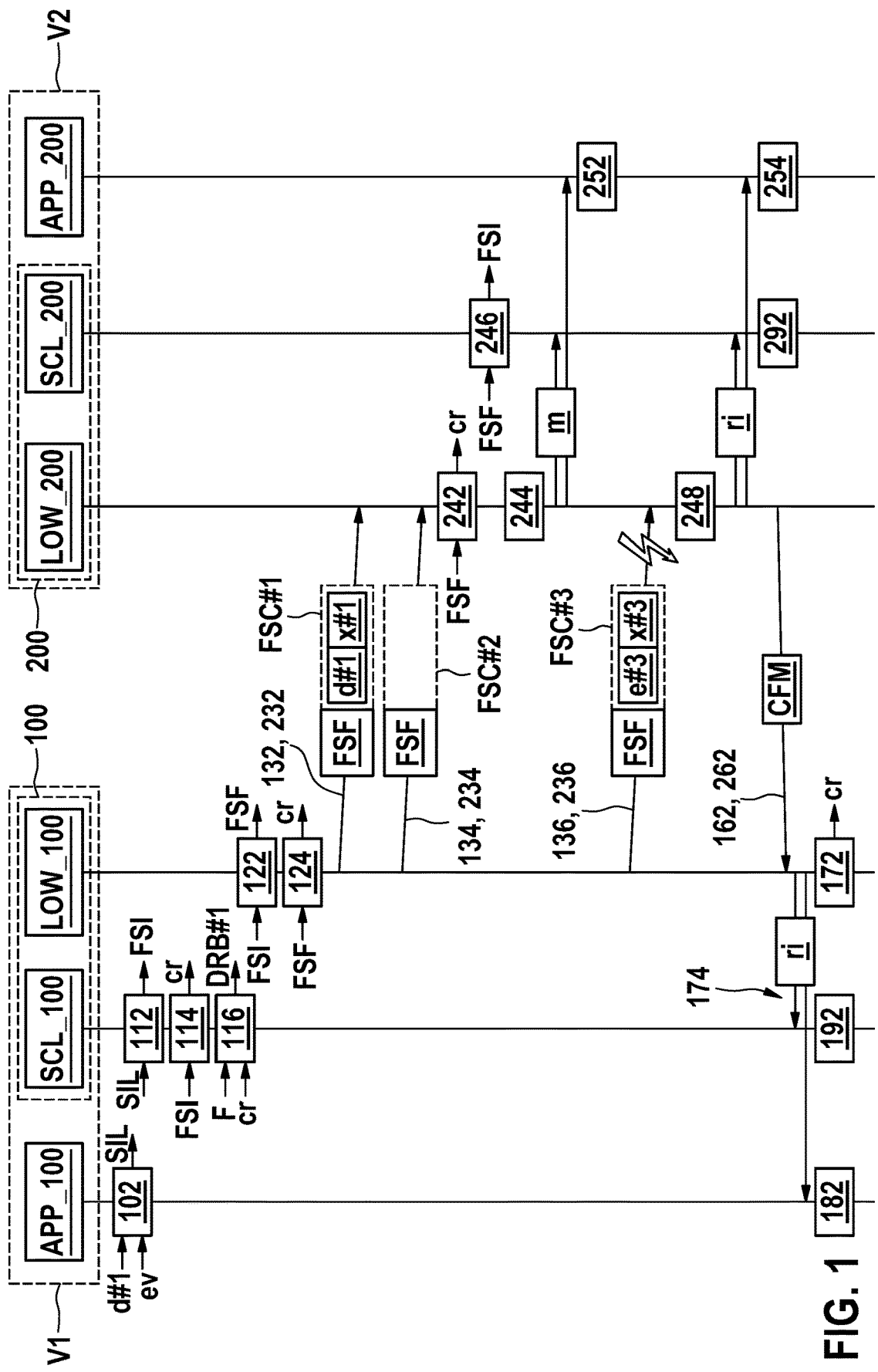
FIG. 1 depicts a schematic sequence diagram, in accordance with an example embodiment of the present invention.

FIG. 1 depicts a schematic sequence diagram, where two entities V1, V2, for example automotive vehicles, communicate with each other. The entity V1, V2 comprise an apparatus 100, 200 that comprises a safety communication layer (short SCL) SCL_100, SCL_200, and a lower layer LOW_100, LOW_200. The lower layer L_100, L_200 is responsible for lower layer processing including at least one of layer 1, 2 according to the OSI/ISO model. An application layer APP_100, APP_200 is responsible for handling data according to safety integrity levels, SIL, in particular automotive safety integrity levels, ASIL, and, of course of Quality Management level(s). In the following examples data d #1, e #3 is transmitted from the apparatus 100 to the apparatus 200.

Throughout the description, the following glossary applies:

Safety integrity level, SIL:
a level of functional safety integrity that is derived from a type of detected risk, hazard, fault, in particular on application layer or functional safety layer.

Functional safety level indicator, FSI:
the FSI is derived from the SIL in order to provide a generalized form of a functional safety level that is relevant for the transmission of functional safety relevant data;

Functional safety indicator, FSF:
the FSF is conveyed on a physical control channel or a MAC-CE, for example; according to an example, the FSF is derived from the FSI. The functional safety indicator FSF has a smaller available range of values than the higher-layer functional safety level indicator FSI.

safety-relevant: for example, safety-relevant V2X data is potentially safety-relevant for the receiver. For example, V2X data announcing an initiation of an emergency braking is relevant for the driving safety of the receiving vehicle. Therefore, 'safety-relevant' can be understood to be 'relevant for the driving safety of the receiving apparatus or vehicle.

data: the examples in the description refer to V2X data. However, the description is also applicable to other application data than V2X data. When referring to 'data', this term encompasses 'application data'.

heartbeat signals a repetitive transmission of FSF together with a functional safety container.

Mapping means 102 map the data d #1 based on an detected event, hazard or risk ev associated with the data d #1 to the at least one safety integrity level SIL.

Mapping means 112 map the data d #1 based on the at least one safety integrity level SIL associated with the data d #1 to a functional safety level indicator FSI. The data d #1 is conveyed along with an associated header, in particular an SDAP, Service Data Adaptation Protocol, header, which comprises the functional safety level indicator FSI as part of or in addition to a QFI that identifies the QoS flow F associated with the data d #1. The FSI is encapsulated in an L2 protocol data unit PDU frame, where in this PDU is encapsulated in L1 frame.

According to another example of the mapping means 112, the FSI may be derived from configuring 3 negotiation layers.

For example, FSI has a 1-bit value, then it is one if ASIL level is C or D, and is zero if ASIL level is A or B. If, e.g., FSI does not exist, then communication is not requiring functional safety.

In yet another example, FSI is a 2-bit value, then it is 00 for A, 01 for B, 10 for C, and 11 for D. If, e.g., FSI does not exist, then communication is not requiring functional safety. One more bit can be added to FSI such that, if all zeros is passed to lower layer/interface sublayer, this indicate a non-functional safety transmission and, in this case, FSI field is always configured and included in the SDAP layer.

In a further example, three different levels may be identified by FSI as follows:
a/(an) (A)SIL level, which may be identified to multi-(A) SIL values, e.g., A-D or 1-4;
A Quality Management (QM) level, which is a non-(A) SIL level, which is related to some identified V2X/Industrial services. This level can, itself, differentiate multiple sublevels if required;
A non-safety, non-(A)SIL, non-QM level which is up to lower layers how to prioritize it.

Mapping means 114 map the data d #1 based on the at least one functional safety integrity level indicator FSI associated with the data d #1 to the functional safety indicator FSF. The mapping means 114 determine at least one communication requirement cr based on the at least one functional safety level indicator FSI or based on the at least one FSF or based on the SIL.

For example, the mapping/translation above results in the pre-configured functional safety indicator FSI. For example, the FSI can be retrieved via a lookup table optionally combined with parameters associated to the event, FuSa level, hazard, risk, etc. The former parameters include periodicity, maximumIrregularity, maximum survival time, NACK rate, consecutive NACK rate, etc. of the event.

The mapping means 116 maps a QoS flow F belonging to the data d #1 to a Data Radio Bearer DRB #1 based on the at least one functional safety level indicator FSI, wherein a transmitting of the data d #1 via transmitting means 132-136 is conducted via the mapped Data Radio Bearer DRB #1. The mapping of the QoS flow F to the Data Radio Bearer DRB #1 comprises: selecting the Data Radio Bearer DRB #1 from a set of available Data Radio Bearers based on a comparison of the determined at least one communication requirement cr with at least one communication parameter associated with a respective one of the available Data Radio Bearers. The FSI is used to map the FuSa data flow associated with the FSI to the appropriate transmission data radio bearer, where the bearer satisfies the required communication parameters associated with the FSI.

Determining or processing means 122, 124 are provided to determine based on the at least one safety integrity level SIL or based on at least one functional safety level indicator FSI or based on the at least one functional safety indicator FSF, at least one communication requirement cr, in particular a periodicity of a transmission of the functional safety indicator FSF, a minimum time period between subsequent transmissions of the functional safety indicator FSF, or a maximum time period between subsequent transmissions of the functional safety indicator FSF. The transmitting means 132-136 initiate the transmission of the plurality of functional safety containers FSC and the plurality of associated functional safety indicators FSF according to the determined at least one communication requirement cr. For example, the at least one communication requirement cr is signaled via a received RRC, Radio Resource Configuration, message or is preconfigured.

According to an example, the determining or processing means 122 determines the at least one functional safety indicator FSF that indicates at least whether the associated data d #1, e #3, especially V2X data, is relevant according to at least one safety integrity level SIL. Accordingly, the data d #1, e #3 can be relevant or not relevant to safety integrity. Then, the transmitting means 132-136 transmit the data d #1, e #3 along with the at least one determined functional safety indicator FSF.

That the data and the at least one functional safety indicator FSF are transmitted 'along' comprises: a that both data and FSF are transmitted via the same resource block, b that both data and FSF are transmitted via adjacent radio resource, c that both data and FSF are transmitted via radio resources spaced apart by frequency and time.

According to an example, the determining or processing means 122 determine at least one functional safety indicator FSF that indicates at least whether associated data d #1, e #3, especially V2X data that comprises at least one of a vehicle operating parameter and a roadway event, is relevant according to at least one safety integrity level SIL. Other examples for the data comprise: industrial data that comprises a machine operating parameter, and building technology data that comprises building operational data. Accordingly, the data d #1, e #3 can be relevant or not relevant to safety integrity. The transmitting means 132-136 transmit the data d #1 along with the at least one determined functional safety indicator FSF.

According to an example, the at least one functional safety indicator FSF comprises at least two values, for example in form of a bit.

According to a first value, the FSF indicates that there is a SIL-relevance according to at least one safety integrity level SIL. According to a second value, the FSF indicates that there is no safety relevance according to at least one safety integrity level SIL. The second value may indicate a "Quality Management" level indicating a risk associated with a hazardous event does not therefore require safety measures according to a safety integrity level SIL.

According to an example, the determining or processing means 112 determine, for the V2X data d #1, a functional safety level indicator FSI that indicates at least one of a plurality of safety integrity levels SIL. The determining of the at least one functional safety indicator FSF, according to the determining or processing means 122, is based on the functional safety level indicator FSI.

The at least one communication requirement cr is signaled to the apparatus 100, 200 via a received RRC, Radio Resource Configuration, message and/or is preconfigured.

A further indicator x #1, x #3, for example a bit, is transmitted along with the data d #1, e #3 indicating an SIL-relevance of the data d #1, e #3 itself.

According to an example, the transmission and reception of the plurality of functional safety indicators FSF is conducted via at least one physical control channel, in particular via at least one of a Physical Uplink Control Channel, PUCCH, a Physical Downlink Control Channel, PDCCH, and a Physical Sidelink Control Channel PSCCH According to another example, the transmission and reception of the plurality of functional safety indicators FSF is conducted via a respective MAC-CE, Medium Access Control-Control Element.

After receiving, via receiving means 232-234, the plurality of functional safety containers FSC offset in time along with at least one associated functional safety indicator FSF, decision or processing means 244 decide, at least based on a plurality of reception times associated with the plurality of functional safety indicators FSF, whether the received transmission is part of the functional safety repeated heartbeat (including FSF); and whether the received data d #1, e #2 qualify to be processed via processing means 252 according to at least one safety integrity level SIL. The processing means 525 will take action in order to comply with safety requirements derived from the corresponding SIL.

For example, a marker m is determined that indicates whether the V2X data d #1, e #3 conveyed in the respective functional safety container FSC qualifies to be processed according to the at least one safety integrity level SIL at processing means 252 of the application layer APP 200. As V2X data d #1 is SIL-relevant and the V2X data e #3 is not, both, at first instance, qualify for SIL processing. But a further indicator not shown determines whether V2X data d #1, e #3 is SIL-relevant. Based on this further marker the marker m is determined.

A further indicator x #1, x #3, for example a bit is transmitted along with the data d #1, e #3 indicating a SIL-relevance of the data, wherein data e #3, which is marked by the further indicator x #3 as not SIL-relevant, is excluded from the decision of the decision means 244.

Determining means 242 determine the communication requirement cr based on at least one of the functional safety indicators FSF. Advantageously, a mapping between the functional safety indicator and the communication requirement enables monitoring parameters without further communication or configuration overhead.

The decision via the decision means 244 is made based on whether at least one monitored communication parameter associated with the reception times, matches the communication requirement cr that is associated with the at least one monitored communication parameter.

Examples of the communication requirement cr comprise least one of: a periodicity of a transmission of the functional safety indicator FSF, a minimum time period between subsequent transmissions of the functional safety indicator FSF, and a maximum time period between subsequent transmissions of the functional safety indicator FSF.

Moreover, the detection of the functional safety indicator triggers the device's higher L2 sublayers to identify the encapsulated FSI, where the FSI is sent to the receiver higher layers to evaluate the possible event, functional safety level, risk, hazard, etc.

At the receiver side, mapping means 246 map the lower-layer functional safety indicator FSF to a higher-layer functional safety indicator FSI that is associated with the data d #1.

The translation between FSI and FSF by the mapping means 122 and 246 is conducted in order to reduce the granularity and range of possible FSIs to be able to be signaled over L1 (physical) control channel and/or L2 (e.g., MAC) control channel (e.g., MAC control Element). Triggering the lower layers to activate its FuSa monitoring is sufficient. Based on limited FSF levels/value ranges, the specific malfunction procedures are performed. Moreover, FSF is used to identify heartbeat transmissions, which is subject to L1 measurements and L2 measurement report generation.

According to an example, a function for determining the translation between FSI and FSF and vice versa could be characterized by the following Pseudocode ("Pseudocode 1").

```
*** Pseudocode 1 - START ***
<Function 1>
#In the main function, execute the measurements if a certain FSF
is found and extracted from L1 and/or L2 control #channel is
detected
If FSF = true
    measurements= excute_measurements(Input_signal, FSF) # i.e.,
    according to FSF detected level
    end
fault = L1_L2_Procedure_Monitor(parameters,...)
<Function 2>
#Possible L1_L2_Procedure_Monitor pseudocode
return fault = L1_L2_Procedure_Monitor(parameters,...)
if parameters.Periodicity ~= measurements. Periodicity
    if measurements.irregularity >
    parameters.irregularityThreshold
        fault = "non-periodic-not-accepted-irregularity"
        else
        fault = "periodic-not-accepted-irregularity"
    end if
else
    fault = "no_fault"
end if
if measurements.NACK_Counts > parameters.NACK_Counts
    fault = "too_many_errors_not_stable_channel"
else
    fault = "no_fault"
end if
if measurements.survivalTime > parameters.survivalTimeMax
    fault = "channel_packet_loss_blockage"
else
    fault = "no_fault"
end if
*** Pseudocode 1 - END ***
```

According to an example, after receiving data d #1, via the receiving means 232-236, along with the at least one functional safety indicator FSF that indicates at least whether the associated data d #1, e #3 is relevant according to at least one safety integrity level SIL, the deciding or processing means deciding 244 decide whether to process, via processing means 252, the data d #1 according to at least one safety integrity level SIL that is indicated by a functional safety level indicator FSI that is received along with the data d #1. Furthermore, a QoS flow is identified by the QFI that is conveyed along with the functional safety level indicator FSI.

The data d #1 is conveyed along with an associated header, in particular an SDAP header, which comprises the functional safety level indicator FSI as part of or in addition to a QFI that identifies the QoS flow F associated with the data d #1. The SDAP header (in 5G protocol encapsulation) includes the SFI, for example in addition to the QFI (QoS Flow Indication).

The transmission initiated by transmitting means 136 is not correctly received by receiving means 236 of the apparatus 200. In other words, a communication error occurs. This communication error is determined via determining means 248. The determining means 248 determines a reaction indicator ri indicating an execution of a fail-safe function 254, if the at least one monitored communication parameter does not match the communication requirement cr.

Transmitting means 262 transmit a communication failure message CFM indicating a failure in communication, if the at least one monitored communication parameter does not match the determined communication requirement cr.

According to an example, the receiver detects that a survival time associated with the transmission of the plurality of safety containers is exceeded and transmits this information as part of the failure message.

According to another example, if the receiver of the plurality of functional safety containers is not able to decode the functional safety data or detect and decode the functional safety indicator FSF, then the receiver transmits a negative acknowledgement, NACK, as part of the failure message.

According to an example, a Channel State Information is updated upon determining the reaction indicator, wherein the Channel State Information represents the communication failure message.

The executed measurements at the receiver, which is dependent on the decoded FSI value and the associated parameters, shall be sent back to the transmitter entity in form of the communication failure message. The transmitter is enabled to evaluate: 1 channel monitored values e.g., extended channel state information CSI report indicating FuSa malfunction evaluation, e.g., from the table; 2 failures e.g., using extending NACK reports evaluating NACK rate, consecutive NACK rate, exceeding consecutive NACK count/threshold, etc.; 3 QoS reports including values e.g., detected high QoS, medium QoS, low QoS, etc.; 4 survival time e.g., survival time exceeding a certain threshold, continuously increasing survival time, etc.

For example, the decoding of functional safety indicator shall indicate the pre-configured FuSa transmission parameters/the communication requirements associated with functional safety monitoring, e.g., transmission periodicity, maximum granularity, survival time, expected HARQ rate, expected consecutive NACKs, etc.

Receiving means 162 receive at least one communication failure message CFM indicating a failure associated with the transmission of at least one of the plurality of functional safety containers FSC and/or associated with the transmission of the at least one of the plurality of functional safety indicators FSF.

Changing or processing means 172 are provided for changing, based on the at least one communication failure message CFM, the at least one communication requirement cr for the transmission of the functional safety containers FSC and/or the transmission of the functional safety indicators FSF. By changing the communication parameter, the functional safe communication state on the receiver side can be maintained or re-established as the transmission initiation is changed.

Providing or processing means 174 provide, upon receiving the at least one communication failure message CFM, a reaction indicator ri, for example to a higher-layer function, indicating an execution of a fail-safe function 182 for example, at application layer APP_100.

Instead or additionally, a defense function 192, 292 is initiated upon receiving the reaction indicator ri. The defense function 192, 292 reacts in dependence on information received from the lower layer function LOW_100, LOW_200, for example conveyed together with the reaction indicator ri.

The functional safe system comprising the apparatuses 100 and 200 is provided as a detection is made if the received packet/data corresponds to the latest send out by the transmitter side. One option is to identify error via regularly (periodic/quasi-periodic) transmission, e.g., Semipersistent Scheduling, SPS. The SPS should be adapted to include the FSI and/or FSF derived from or mapped to (A)SIL level or a Quality Management transmission. In case if the system does not identify (A)SIL or QM, the system has to identify this or leave it to lower layers.

The FuSa lower-layer signaling carriers are provided by the lower layers LOW_100 and LOW_200. The repeated transmission of functional safety containers FSC #1-3 together with the FSF provide a functional safe heartbeat. This heartbeat is carried over an SPS by defining an irregular or quasi-regular heartbeat transmission fitting the SPS/configured grants nature. Wherein the irregularity range can be configured/pre-configured to the UEs in advance, i.e., also irregularities may be configured based on the ASIL/SIL value in (or mapped) the FSI. In order to handle the safety communication in lower layers and to utilize lower layer defense mechanisms and measurements, an interface connecting the safety communication layer, SCL, and lower layers is assumed. Moreover, the defense mechanisms are split between the SCL and lower layers, where interaction messages, decisions, and measurements values are assumed to pass through the aforementioned interface.

A (functional safety) split between lower layer LOW_100, LOW_200 and the safety communication layer SCL_100, SCL_200 that passes mandatory safety related information to lower layer LOW_100, LOW_200, is provided. As described above, the lower layer LOW_100, LOW_200 comprises validation and mapping of the passed safety related information from SCL to DRBs and/or physical resources. Moreover, the lower layer LOW_100, LOW_200 comprises passing (back-and-forth) through an interface the safety related metrics/measurement reports to the SCL and safety information and requirements to lower layers.

Defense matrix/mechanisms are split into two parts, one to be handled inside the gray communication channel via insertion and monitoring FSF transmissions. Further defense mechanisms will be carried out (again) in SCL_100, SCL_200. In this case, further defenses in SCL shall be assisted by information passed and triggered via lower layers. In other words, SCL_100, SCL_200 executes exception handling based on the passed information from layer 1 and/or layer 2 L1/L2. SCL and lower layer are connected via an interface (passing-up lower-layer measurements and metrics; passing-down FuSa requirements). Defense mechanism is split between two defense matrices: a proactive communication defense matrix and a reactive SCL defense matrix.

Figure 2:
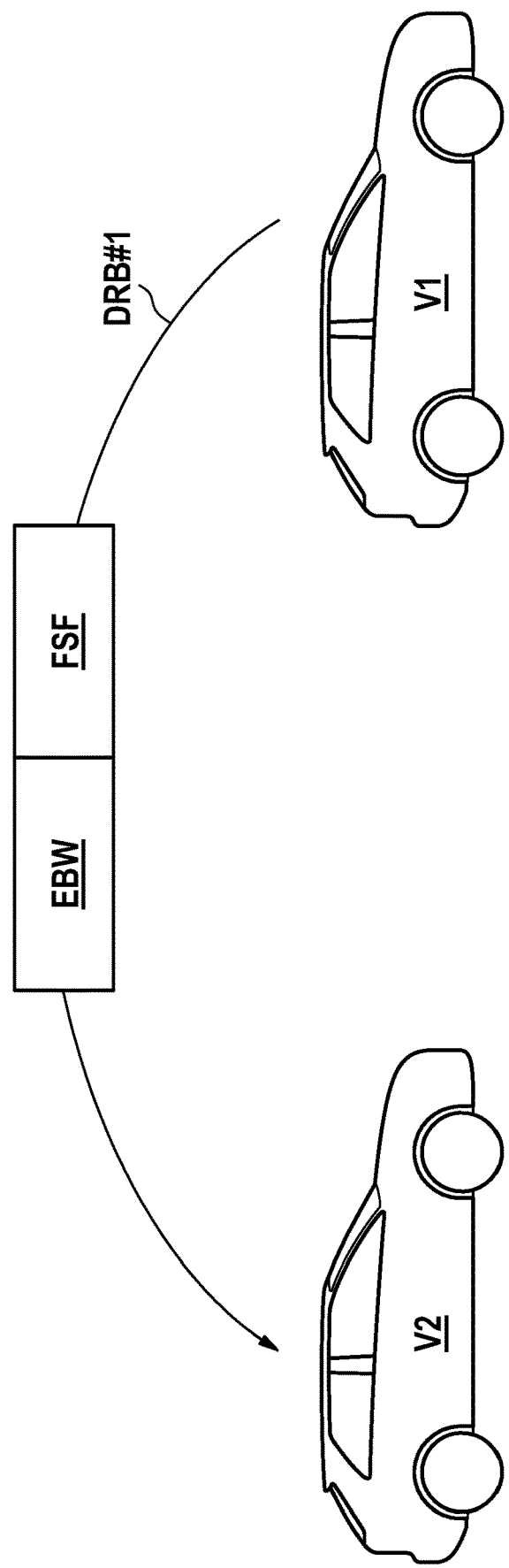
FIG. 2 depicts radio communication between two vehicles, in accordance with an example embodiment of the present invention.

FIG. 2 depicts a communication originating from the first vehicle V1 to the second vehicle V2 driving behind vehicle V1. Vehicle V1 transmits a V2V Emergency Brake Warning message EBW. This message is a message that is subject to functional safety integrity handling. Functional Safety is referred to in this description also as 'FuSa'. On the other hand, when referring to QM ('Quality Management') level, then non-FuSa data or relevance is referred.

As there can be different understandings and interpretations of how to map the (A)SIL levels to the different procedures/events for different OEMs, a higher-layer functional safety indicator FSI is determined. Based on the FSI, the vehicle V1 is able to select a data radio bearer, DRB, for the transmission. In this form, the functional safety indicator provides that events like an emergency braking of vehicle V1 be standardized.

From higher layer FSI values (with more granularity compare to ASIL), the vehicles V1, V2 of different OEMs OEM-1 and OEM-2 can interpret or match the (A)SIL, (Automotive) safety integrity level, that has the same or equal functional safety procedure required from TX. In this case, A functional safety indicator FSF is transmitted along with the V2X Emergency Brake Warning message EBW, what is referred to in this description as a 'heartbeat'. The transmission of the FSF provides a 'grey communication channel' being able to describe and convey the events, parameters, risks, hazards and faults. Such a standardized FSI could be like this:

| FSI value | Events (Examples) | Parameters | risks | hazards | faults | E.g., of Interpretation |
|---|---|---|---|---|---|---|
| 1 | CV Vehicle becomes an obstacle to other vehicles which may cause an accident. → now CV vehicles send a message | Periodicity, maximum irregularity (Tmin, Tmax), Survival Tmax, et | Not received | Many other obstacles | Accident | If received QM or (A)SIL If failed → move to OEM specific (A)SIL |
| 2 | ... | ... | ... | ... | ... | ... |

According to an example, a function for determining the functional safety indicator FSI could be characterized by the following Pseudocode ("Pseudocode 2").

```
*** Pseudocode 2 - START ***
# (A)SIL <--> FSI interpretation
enumerate fault
If (OEM-A Transmitted event FSI-1 and OEM-B received FSI-1)
    OEM-B RX entity evaluates FSI-1 packet flow and heartbeat
    FSI-1           (L1_L2_Procedure_Monitor)
      If (monitored FSI-1 is not showing a fault)
              OEM-B RX entity will interpret the event to its
internal               design QM level or (A)SIL level (may be
lowest according to        OEM interpretation)
      Else if(monitored FSI-1 is showing a fault) #returning from
      Function(L1_L2_Procedure_Monitor)
              OEM-B RX entity will interpret it based on what may be
                  recommended in the table (fine)
              Or
              OEM-B RX entity will interpret it based on what is
                  implemented by OEM engineers (fine if still follow
the FuSa          certificates)
      End if
End if
*** Pseudocode 2 - END ***
```

The example of Pseudocode 1 can be considered in the functional safety layer if lower layer gray channel is not implemented or did not deliver sufficient information/measurements.

On the other hand, if the gray channel is implemented, the gray channel assists or complement functional safety layer with measurements and evaluation to failure to specified events (FSI). The functional safety layer will interpret the FSI values and analyze the associated fault/malfunction handling in the gray channel.

Figure 3:
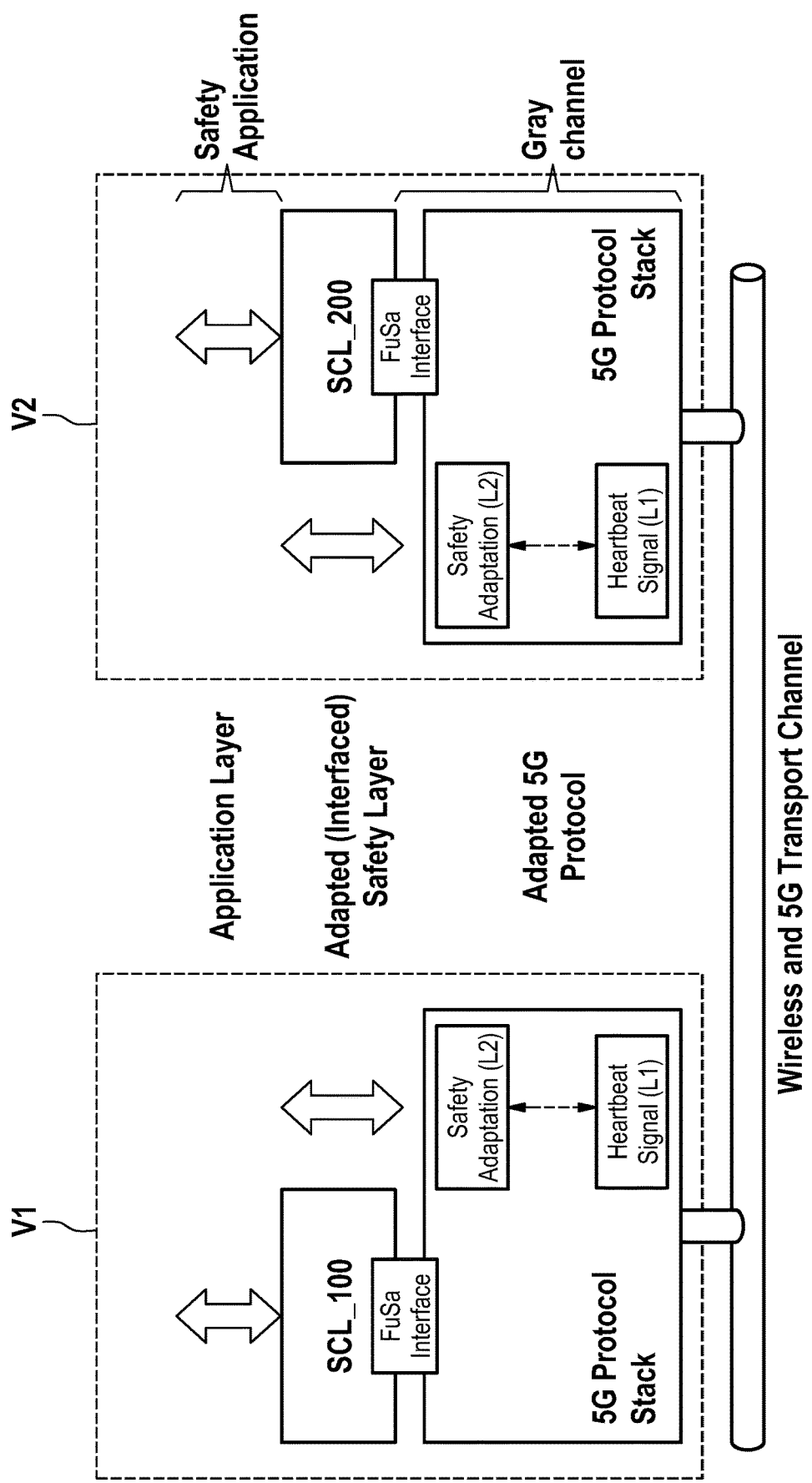
FIG. 3 depicts a schematic protocol stack, in accordance with an example embodiment of the present invention.

FIG. 3 depicts a schematic protocol stack for wireless communication. The 5G Protocol stack or communication transport layer comprises a block 'Safety Adaption Layer (Layer 2)' that reads (A)SIL and the corresponding safety application and changes it into standardized FSI. Later, it maps the FSI to existing bearer (note, bearers are always changing based, e.g., on channel availability). The Safety Adaption Layer identifies heartbeat parameters through the mapping of FSI to P, Tmin, Tmax. The 5G Protocol stack or communication transport layer comprises a block 'Heartbeat signal (Layer 1)': this is the function that implements the heartbeats, adding to it the FSF field, and manage resource to send the heartbeat every P strictly or with best effort between Tmin/Tmax.

The system comprises a safety application layer that handles and runs safety related information, a safety adaption layer that is adapted to fit passing safety markers to lower layers or accept safety metrics from lower layers, and an adapted black channel in form of the gray channel that identifies safety related markers and carries a safety related information, e.g. a sequence.

As explained above, the safety communication layer SCL_100, SCL_200 passes the safety related information/markers/identifier, e.g., (A)SIL or mapped values from it, to lower layers. The proposal, additionally, requires the SCL to handle exceptional (e.g., fail-safe) and/or to enhance it safety mechanisms utilizing the safety related markers/indicators/defense-results passed by lower layers.

The SCL_100, SCL_200 provides its defense mechanism together with a lower layer defense mechanism, i.e., including lower layer error reports, e.g., Automatic repeat request (ARQ), survival time, packet error ratio (PER), etc.

Additionally, the solution proposes to have an interface (FuSa Interface), which connects the SCL_100, SCL_200 to lower layers. In turn, the interface will carry the safety related marker/FSI mapping associated with the data/packet being sent to lower layers. In the other direction, the interface will pass safety related reports/error-metrics to the SCL.

Lower layer FuSa procedures comprise at least one of the following:
Map the safety related marker/(A)SIL to a functional safety identifier (FSI), which may be carried in an FSI field in SDAP header;
Map the FSI (may be together with QoS flow) to a certain radio bearer (RB) identifying it as a safety related communication RB;
Trigger a functional safe ciphering/masqueraded protection and identification, and reordering/insertion identification in PDCP layer;
Trigger a functional safe error detection and error reporting in RLC/L1 based on hybrid automatic repeat request (HARQ) and/or L2 automatic repeat request (ARQ). If survival time is identified in RLC, MAC, and L1, RLC may send reports for survival time expiration handling/values/etc.;

MAC identifies an FSF fields mapped from the FSI value in, e.g., the SDAP header. This value (FSF bits) is passed to L1 to be marked on each heartbeat signaling. Adapted resource allocation may be prioritized in MAC based on FSF field mapped (for TX packets) or decoded (from each received packet).

Additionally, L1 can send heartbeat signal with FSF identification. Additionally, L1 may identify the following for functional safety mechanism: Transmission power, Sudden channel fading, Transmission errors/channel errors, Maximum survival time expiration/maximum packet delays, Irregularity metric (e.g., rate, duration, etc. of irregular SPS), Dropped RX packets/interference (e.g., in band interference).

The defense mechanism in lower layers will be triggered and executed based on malfunction metrics or error function values. Furthermore, the defense mechanism in SCL is assisted by the error/malfunction information passed/triggered by lower layers (e.g., the gray channel) through the safety-Gray channel interface and further L2/L1 adaption as mentioned above. In other words, SCL can execute exception handling based on passed information, i.e., measurement reports. These reports are relayed by the safety-Gray channel interface (FuSa Interface). These reports may include Tmax/survival time, PER, HARQ counts, etc., i.e., as indicated above.

The first table will indicate possible examples for safety related defense mechanism that should be handled in lower adapted layers, i.e., the gray channel. The table is handled in lower layers allowing measurements for generating reports for upper layer/safety communication layer.

TABLE

Lower layer (black/gray channel) malfunction handling:

| defense method | Used against this threat |
| --- | --- |
| Tmax/survival time | delays, deletion |
| Physical/MAC S/D ID (Source/destination ID mismatch report) | Insertion |
| HARQ/RLC ARQ | Corruption, Inconsistency |
| Toggling bit(s) | Repetition, deletion, insertion, incorrect sequence |
| Max Irregularity | delays, deletion |

SCL is assisted by the malfunction handling sent from the lower layer. For example:
Deletion/Delays may be detected from a SCL sequence number added and/or from the Tmax/survival time values received from lower layers;
Corruption, Inconsistency may be detected from SCL safety code (e.g., CRC) or from received HARQ/and RLC reports,
SCL source and distention ID mismatch detection may have early indication if Physical/MAC source/destination ID mismatch reports are detect/passed to SCL.

Figure 4:
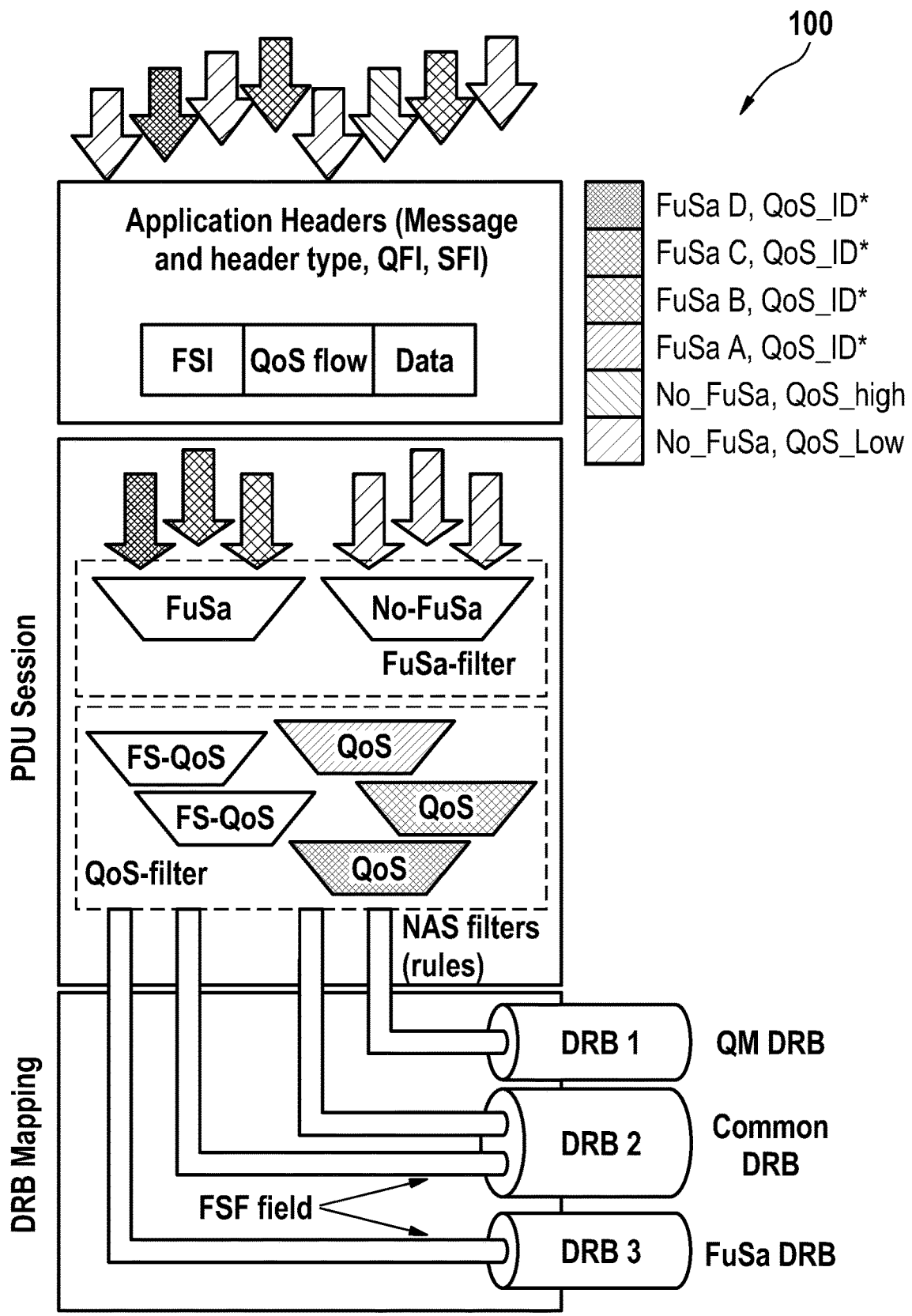
FIG. 4 depicts a schematic block diagram of a transmitting apparatus, in accordance with an example embodiment of the present invention.
Figure 5:
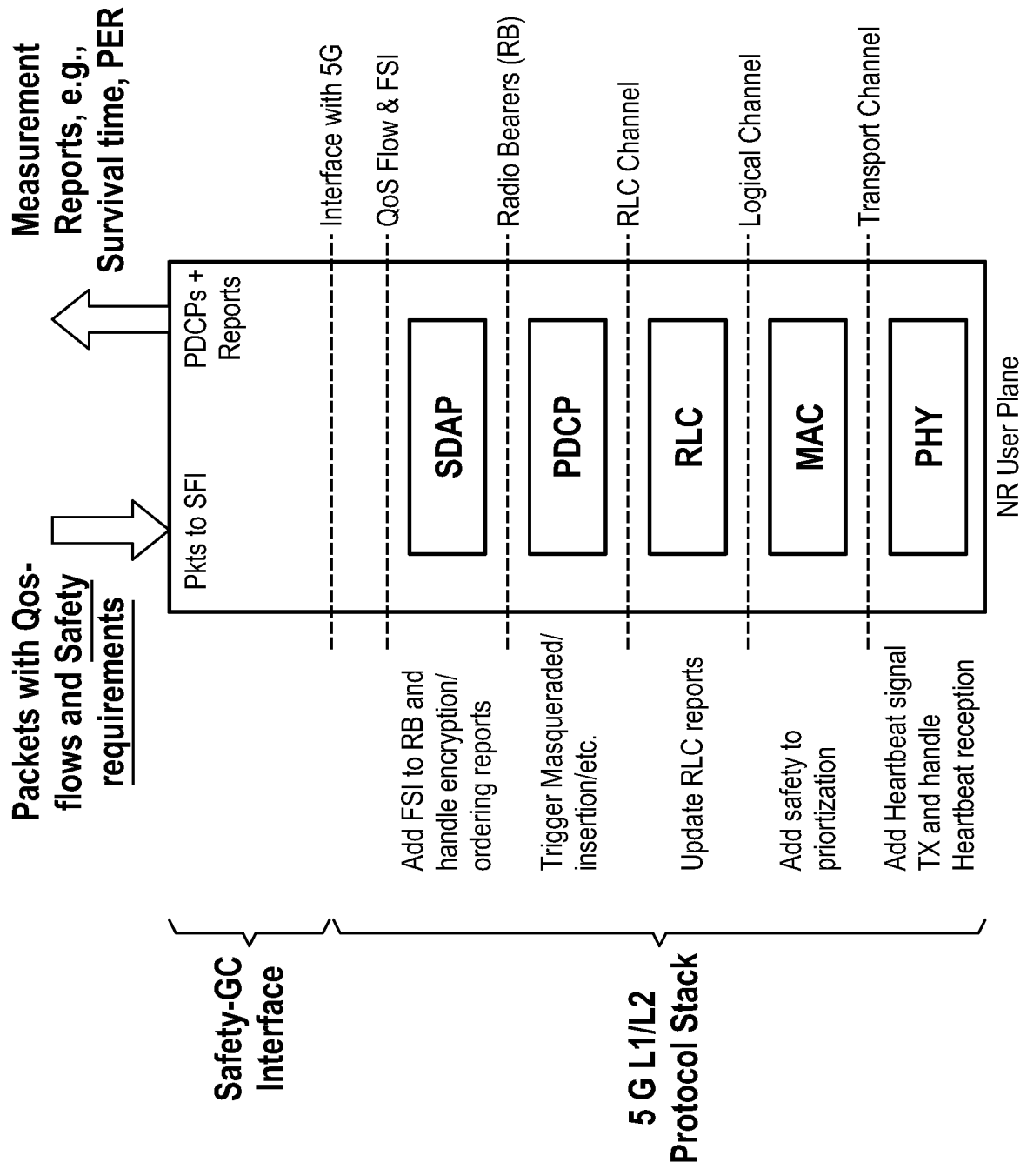
FIG. 5 depicts a schematic layer diagram, in accordance with an example embodiment of the present invention.

FIG. 4 depicts a schematic block diagram of the transmitting apparatus 100, in particular FSI filtering and DRB mapping. For each PDU session, a non-access stratum (NAS) filter in the UE and/or NAS filter in the core network in a user-plane function (UPF) shall map the application packets/data (e.g., IP packets, e.g., passed to communication layer via safety communication layer) to different FSI values and QoS Flows indicators (QFI). Both FSI and QFI shall be stamped/identified in the PDU session packets, i.e., which is mapped to the SDAP header (as in Figure XYZ).

Once the packets/data passes beyond the SDAP layer, the packets are mapped to different data radio bearers (DRB). In a first example, a bearer may be established to allocate FuSa related packets (identified with SDAP headers with FSI and QFI (if QFI exist). In a second example, another DRB may be established to allocate FuSa together with QM packets, i.e., if resources are available. In a third example, a DRB may be established to allocate non-FuSa (QM only) packets.

In transmissions in V2X, FSF is derived from the QFI (or 5QI) and the FSI field inserted in the SDAP (of a PDU session).

Example 1: an 8 values (3-bit FSF) mapping the QFI and SFI, such that:
level 0: FSI-1 and 2 and QoS-high,
level 1: FSI-3&4 and QoS-high, level 3 to 7,
remaining QoS flows (QM) and non-FuSa.
Example 2: two fields such that:
FSF mapping the old QFI/5QI,
FSF mapped to the ASIL or SIL levels (e.g., 2-bit fields) or a truncated value of the ASIL/SIL levels, e.g., 1 bit representing A/B (1/2) or C/D (3 or 4).
In sidelink transmission, one can consider either
a FSF mapping to QoS and FSI field (as in Example 1), or
both priority field (i.e., mapping QoS) and Functional safety filed (FSF) bit(s) (i.e., mapping FSI) (as in Example 2).
to be transmitted in the physical control channel. In this case, the data can be mapped to either 1st stage sidelink control channel (SCI) (with a minimum number of bits) or a 2nd stage SCI. A receiving UE will interpret that the transmission is a functional safety related transmission once it decodes either 1st or 2nd stage SCI.

In case of Uu SPS or Uplink configured grants or Uu Dynamic grants (uplink or downlink), the gNB may configure priority field and FSF bits additionally for one or more parallel-configured resources. This can be done in RRC configuration for Type 1 configured grants and/or downlink control channel in SPS and Type-2 configured grants.

Figure 6:
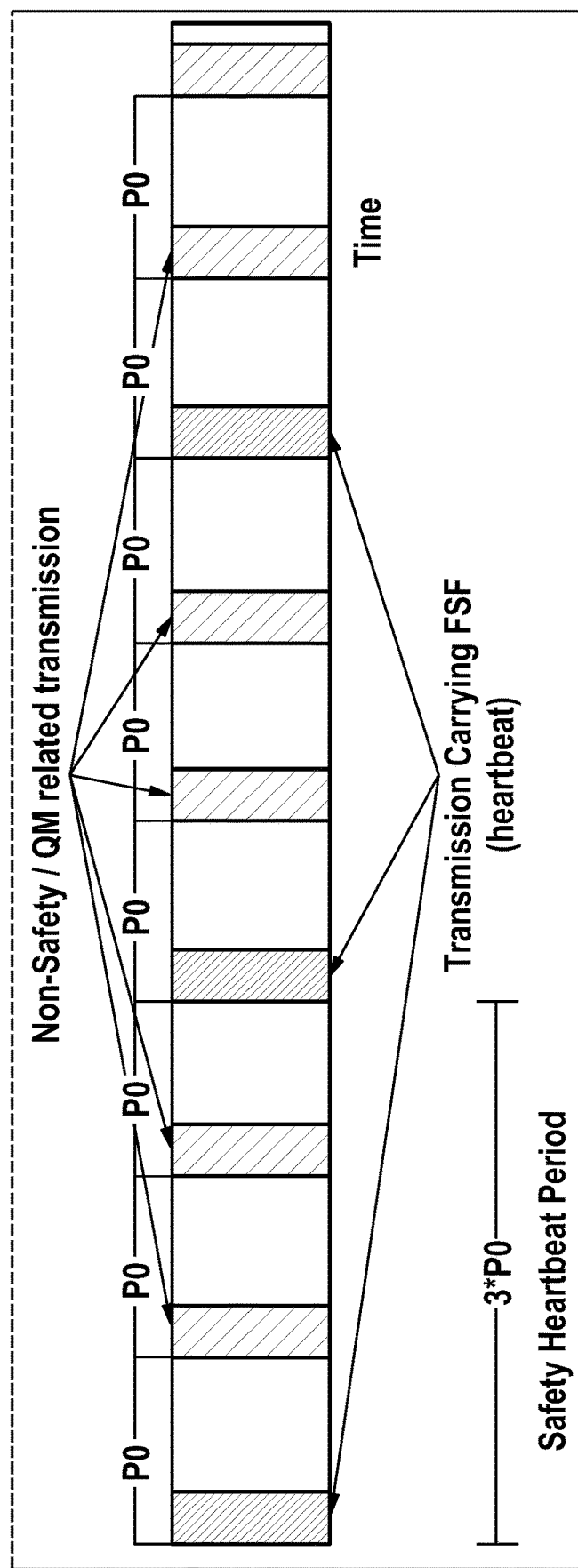
FIG. 6 depicts a schematic time-resource diagram, in accordance with an example embodiment of the present invention.

FIG. 6 depicts a schematic time-resource diagram. In order to classify a functional safe communication transmission on lower layer, a carrier for the communication signaling is implemented in form of heartbeat signals. A periodic transmission like SPS and/or configured grants(CG)) can be used to convey the heartbeat signals. Additionally, an identification to the communication channel, e.g., in the SPS/CG configuration or in the lower-layer signaling control channel, e.g., FSF, can be stamped to the transmission signals.

Figure 9:
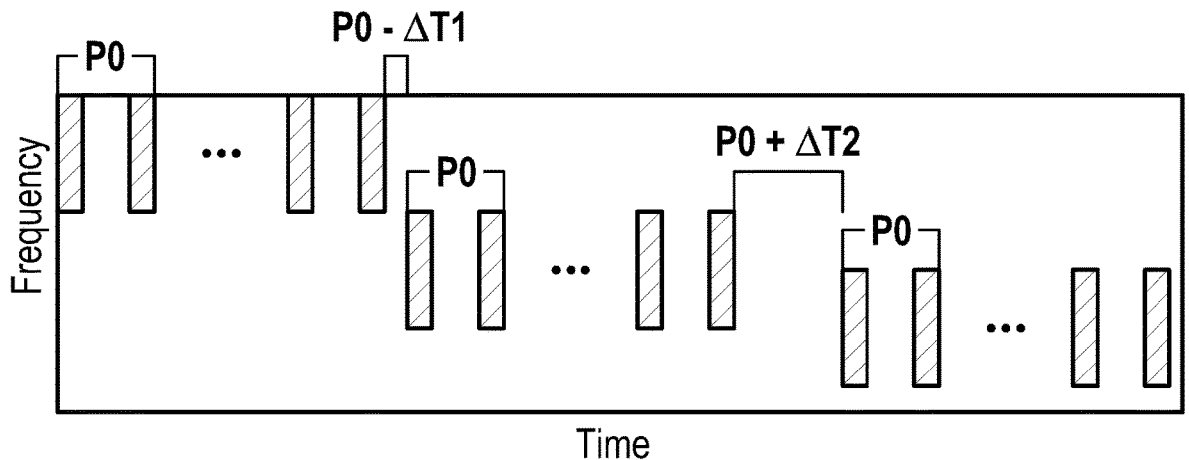
FIG. 9 depicts a time-frequency diagram, in accordance with an example embodiment of the present invention.
Figure 10:
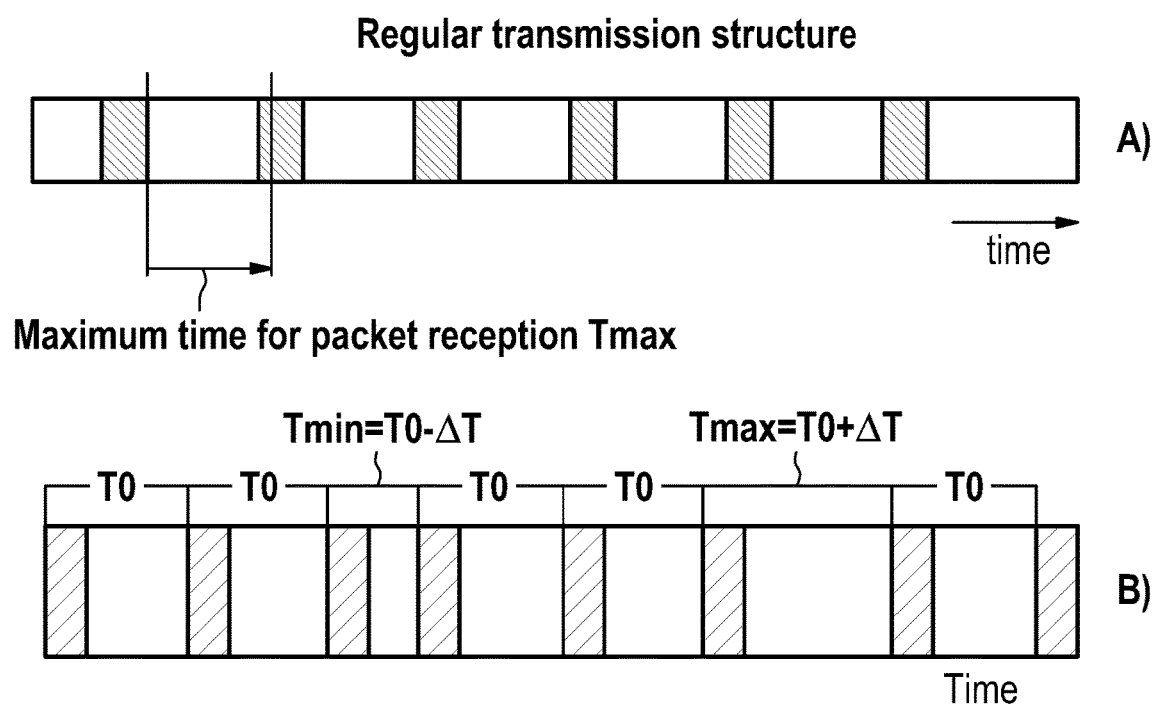
FIG. 10 depicts a heartbeat SPS transmission structure, in accordance with an example embodiment of the present invention.

However, as exemplified in FIG. 9, due to continuous reselection procedure Sidelink SPS and/or due to repeated re-configuration of Uu SPS/CG by gNB, the SPS/CG may represent a kind of irregular heartbeat (i.e., not very regular periodic transmission heartbeats). This means that the messages will not be received in a regular fashion. However, the messages will rather have a distribution with a mean period, T0, and a standard deviation around the mean (i.e., ±ΔT). FIG. 10 depicts how irregular heartbeat looks like. For example, P0–ΔT1 should not be less than the minimum possible early message configured for (A)SIL level and/or the derived priority level (i.e., from QFI and FSI).

However, as exemplified in FIG. 10, the messages will rather have a distribution with a mean period P0, and a standard deviation around the mean (i.e., ±ΔT). For example, T0–ΔT1 should not be less than the minimum possible early message configured for (A)SIL level and/or the derived priority level (i.e., from QFI and FSI).

In case of faulty communication, all the errors listed above have to be detected at the receiver side (in its lower layer). To detect losses at the receiver side, a regular (or rather Quasi-regular) signal structure, i.e., like a heartbeat, can be used. In an example, the transmission of the heartbeat is implemented in lower layers using, e.g., SPS and/or configured grants. In this case, the SPS/configured grants will be the carrier of the functional safety related heartbeat transmission.

Yet, an indication that a transmission is a functional safe transmission can be identified in the physical layer control channel. The reception of the next physical-layer transmission has to be detected periodically with a period P, not later than a maximum time Tmax, and not earlier than Tmin, otherwise the receiving apparatus informs the application or safety-layer about a packet loss or delayed packet. P, Tmax, and Tmin can be configured (or pre-configured) to the UE. A mapping function between FSI and P, Tmax, and or Tmin can also be configured. Additionally, the Tmax can be set to a survival time, where the expiration of such a survival time is transferred to the functional safety layer.

In an example, if configured/preconfigured to the UE to send L2 identified FuSa transmission (via FSI) to reduce irregularity, the UE limits its probability of keep resources (P_keep), for reselection procedure, within the high values, e.g., near to the ending range, e.g., [60%, 80%]. Additionally, for high FSL values (equivalent to high SIL/ASIL) only to a preconfigured maximum value, e.g., 80%.

In another example, the irregularity measurements, e.g., Tmax-actual (measured) and Tmin-actual (measured) are monitored and considered for how many times and how severe they happen. E.g., a timer and/or counter is set to measure how often/long and how many time irregularity happens. If the values exceed a certain (pre-)configured threshold, the UE lower layer has to inform SCL about the exceeded values.

In an example, HARQ feedbacks or assisting information from other UEs in the system to the FuSa SPS are measures of transmission failure. Moreover, delayed feedbacks can also be monitored and considered as malfunctions. E.g., a UE experience too many NACKs feedback (from unicast or group cast communication) may inform the SCL if the number of feedbacks exceeds a certain threshold.

In an example, a toggling bit(s) can be used within or along with the functional safety container to mimic a sequence number. This/these bits can be inserted as an in data control channel (e.g., in uplink, DL, or 2nd stage sidelink control channel) or physical control channel. The receiver will monitor this field and monitor that toggling sequence is correct. A false toggling sequence indicates a deletion/dropped transmission or sequence error.

In an example, if the UE has mixed data associated with FSI for (A)SIL, QM, and non-critical, the UE selects only sub-sequent transmission periods, e.g., when safety related information are transmitted or when the heartbeat has to be carried on a non-safety related information, and mark it with FSF. The non-safety related messages may be sent to in the same SPS but may not be marked with the FSF bits if no heartbeat is carried with the said data.

In an example, the UE/apparatus 100 of FIG. 1 is configured to send the heartbeat signal on already SPS/configured grants if the UE receives a safety related (FSI marked) packets in its L2 buffer. Additionally, the UE may start a new SPS transmission (e.g., using Sidelink resource selection) or request an UL configured grants, if the UE the receives a safety related (FSI marked) packets and the UE does not have configured resources.

Figure 7:
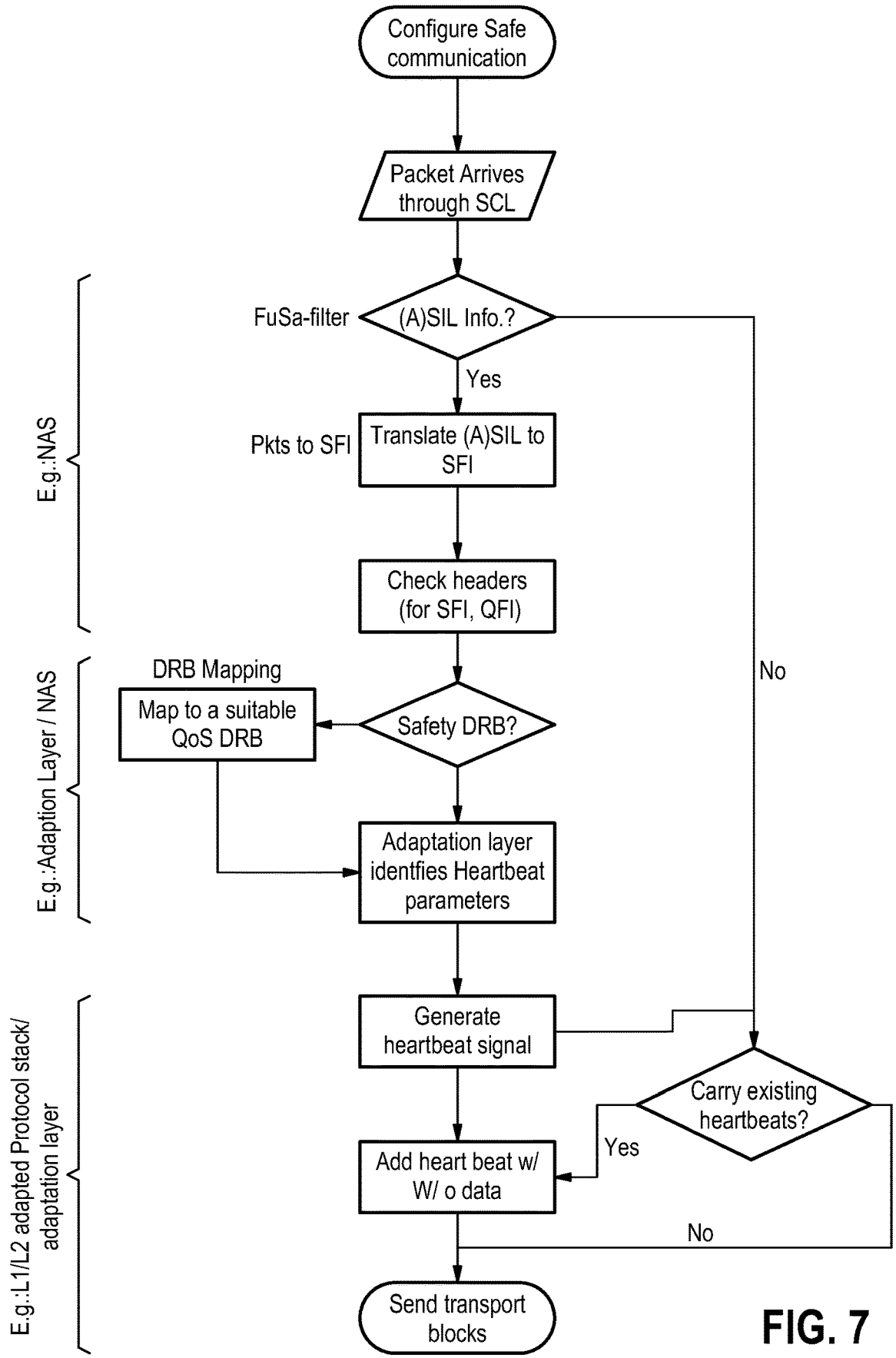
FIGS. 7 and 8 each depict a schematic flow chart, in accordance with an example embodiment of the present invention.

In the latter case, the UE may start SPS transmission whether the UE has multiple MAC buffer PDU packets or even if the MAC has only one PDU packet but safe communication with heartbeat is required. In case of single PDU packet, i.e., which has FSI marked or carrying heartbeat, the UE may send the first transmission and trust upper layers to send more safety related packet as indicated by FSI (and mapped to FSF bits); the UE may send heartbeats only together with control information without data or with the repetition of the last transmitted data FIG. 7 depicts a schematic flow chart indicating a TX procedure once a functional safe communication requirement is configured/identified. TX identifies safe communication, maps to bearer, generates heartbeats according to the required (A)SIL, and sends heartbeats. The transmitter may send safe communication carrying the heartbeat, or heartbeat carried on non-safe communication data, or heartbeat-only signals.

Figure 8:
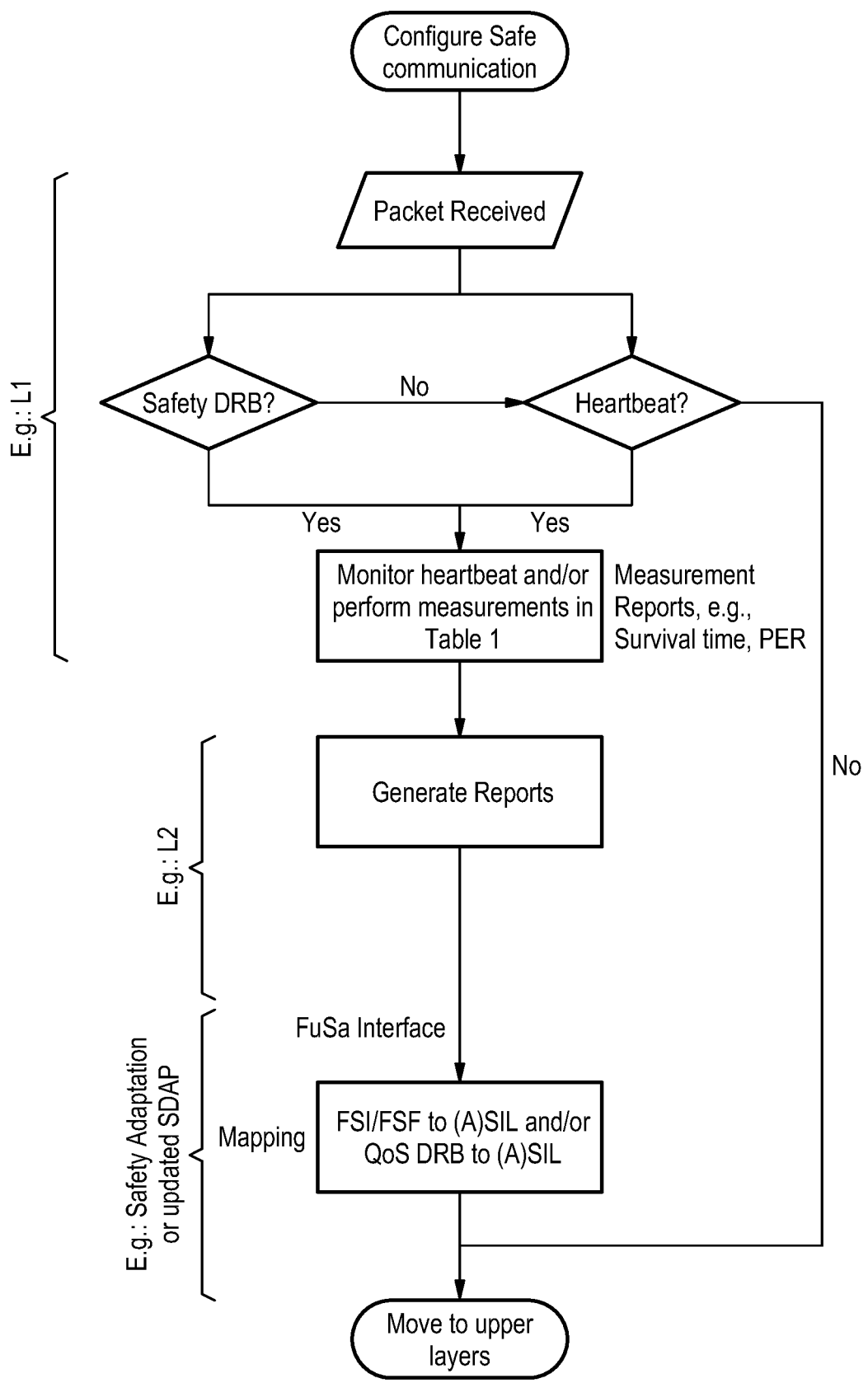

FIG. 8 depicts a schematic flow chart indicating an RX procedure once a functional safe communication signaling is identified on receiver's lower layers. The RX identifies safe communication from heartbeat or identified safe marker, e.g., DRB. The RX monitors heartbeat and/or perform lower-layer measurements according to the identified safety level (e.g., FSF, FSI, (A)SIL, etc.). Finally, the RX sends the safety reports/decisions to upper layers (e.g., SCL).

What is claimed is:

1. A method for an apparatus operating in a wireless communication network, the method comprising:
    transmitting a plurality of functional safety containers offset in time along with at least one associated functional safety indicator that indicates a relevance according to at least one safety integrity level:
    wherein:
        at least one of the plurality of functional safety containers includes data that includes: (i) at least one of a vehicle operating parameter and a roadway event, or (ii) industrial data that includes a machine operating parameter, or (iii) building technology data that includes building operational data; and
        the method further includes at least one of the following steps (I)-(II):
            (I) determining at least one communication requirement based on the at least one safety integrity level, at least one functional safety level indicator that is derived from the at least one safety integrity level, or the at least one functional safety indicator, wherein the communication requirement includes a transmission timing requirement for the functional safety containers, and wherein the transmitting is performed, based on the determining, with a timing that is set according to the transmission timing requirement of the at least one communication requirement; and
            (II) receiving at least one communication failure message indicating a failure associated with the transmission of at least one of the plurality of functional safety containers and/or associated with the transmission of the at least one of the plurality of functional safety indicators.

2. The method according to claim 1, wherein the data is V2X data.

3. The method according to claim 1, wherein the transmission of the plurality of functional safety containers and the plurality of associated functional safety indicators causes a receiving apparatus to decide, at least based on a plurality of reception times associated with the plurality of functional safety indicators, whether the received data qualify to be processed according to at least one functional safety integrity level.

4. The method according to claim 1, wherein a further indicator is transmitted along with the data indicating the relevance according to at least one safety integrity level.

5. The method according to claim 1, further comprising:
    mapping a higher-layer functional safety level indicator that is associated with the data, to the functional safety indicator.

6. The method according to claim 5, wherein the functional safety indicator has a smaller available range of values than the higher-layer functional safety level indicator.

7. The method according to claim 1, comprising:
    the receiving of the at least one communication failure message indicating the failure associated with the transmission of the at least one of the plurality of functional safety containers and/or associated with the transmission of the at least one of the plurality of functional safety indicators.

8. The method according to claim 7, further comprising:
    providing, upon receiving the at least one communication failure message, a reaction indicator indicating an execution of a fail-safe function.

9. The method according to claim 1, wherein:
    the transmission of the plurality of functional safety indicators is conducted via at least one physical control channel, the at least one physical channel including at least one of a Physical Uplink Control Channel, and/or PUCCH, and/or a Physical Downlink Control Channel, and/or PDCCH, and/r a Physical Sidelink Control Channel PSCCH; or
    the transmission of the plurality of functional safety indicators is conducted via a respective Medium Access Control-Control Element (MAC-CE).

10. The method according to claim 1, further comprising the determining of the at least one communication requirement based on the at least one safety integrity level, the at least one functional safety level indicator that is derived from the at least one safety integrity level, or the at least one functional safety indicator, wherein the communication requirement includes the transmission timing requirement for the functional safety containers, and wherein the transmitting is performed, based on the determining, with the timing that is set according to the transmission timing requirement of the at least one communication requirement.

11. The method according to claim 10, wherein the at least one communication requirement includes a periodicity of a transmission of the functional safety indicator, or a minimum time period between subsequent transmissions of the functional safety indicator, or a maximum time period between subsequent transmissions of the functional safety indicator, or a maximum time allowed for failed/skipped transmissions of the functional safety indicator, or a maximum allowed irregularity of the received functional safety indicator signal, or a maximum allowed number of packet failure.

12. An apparatus configured for operation in a wireless communication network, the apparatus comprising:
    a transmitter configured to transmit a plurality of functional safety containers offset in time along with at least one associated functional safety indicator that indicates a relevance according to at least one safety integrity level;
    wherein:
        at least one of the plurality of functional safety containers includes data that includes: (i) at least one of a vehicle operating parameter and a roadway event, or (ii) industrial data that includes a machine operating parameter, or (iii) building technology data that comprises building operational data; and the apparatus further includes at least one of the following features (I)-(II):

(I) the transmitter is configured to determine at least one communication requirement based on the at least one safety integrity level, at least one functional safety level indicator that is derived from the at least one safety integrity level, or the at least one functional safety indicator, wherein the communication requirement includes a transmission timing requirement for the functional safety containers, and wherein the transmission is performed, based on the determining, with a timing that is set according to the transmission timing requirement of the at least one communication requirement; and (II) the apparatus is configured to receive at least one communication failure message indicating a failure associated with the transmission of at least one of the plurality of functional safety containers and/or associated with the transmission of the at least one of the plurality of functional safety indicators.

13. A method for an apparatus operating in a wireless communication network, the method comprising:

receiving a plurality of functional safety containers offset in time along with at least one associated functional safety indicator that indicates a relevance according to at least one safety integrity level, wherein at least one of the plurality of functional safety containers includes data that includes: (i) at least one of a vehicle operating parameter and a roadway event, or (ii) industrial data that includes a machine operating parameter, or (iii) building technology data that comprises building operational data; and deciding, at least based on a timing of a plurality of reception times associated with the plurality of functional safety indicators, whether the received data qualify to be processed according to at least one safety integrity level.

14. The method according to claim 13, wherein a further indicator is transmitted along with the data indicating a SIL-relevance of the data, wherein data, which is marked by the further indicator as not SIL-relevant, is excluded from the decision.

15. The method according to claim 13, wherein the decision is made based on whether at least one monitored communication parameter associated with the reception times, matches a communication requirement that is associated with the at least one monitored communication parameter.

16. The method according to claim 15, wherein the method further comprises:

determining a reaction indicator indicating an execution of a fail-safe function, when the at least one monitored communication parameter does not match the communication requirement.

17. The method according to claim 15, further comprising:

transmitting a communication failure message indicating a failure in communication, when the at least one monitored communication parameter does not match the determined communication requirement.

18. The method according to claim 13, further comprising:

mapping the functional safety indicator to a higher-layer functional safety indicator (FSI) that is associated with the data.

19. The method according to claim 18, wherein at least one lower communication layer provides possible functional safety data encapsulating FSI in the received data to a higher part of layer 2, wherein the encapsulated FSI level assists the receiver lower layer to identify a plurality of parameters for received FSF repetitive transmission, and wherein the parameters are used to monitor and decide on the failure of a functional safety transmission.

20. An apparatus, comprising:

a receiver configured to receive a plurality of functional safety containers offset in time along with at least one associated functional safety indicator that indicates a relevance according to at least one safety integrity level, wherein at least one of the plurality of functional safety containers includes data that includes: (i) at least one of a vehicle operating parameter and a roadway event, or (ii) industrial data that includes a machine operating parameter, or (iii) building technology data that comprises building operational data; and decision device to decide, at least based on a timing of a plurality of reception times associated with the plurality of functional safety indicators, whether the received data qualify to be processed according to at least one safety integrity level.

21. A method, comprising:

providing an apparatus including a transmitter configured to transmit a plurality of functional safety containers offset in time along with at least one associated functional safety indicator that indicates a relevance according to at least one safety integrity level, wherein at least one of the plurality of functional safety containers includes data that includes: (i) at least one of a vehicle operating parameter and a roadway event, or (ii) industrial data that includes a machine operating parameter, or (iii) building technology data that comprises building operational data; and using the apparatus in a wireless communication network; wherein the method includes at least one of the following features (I)-(II):

(I) in the use of the apparatus, the transmitter determines at least one communication requirement based on the at least one safety integrity level, at least one functional safety level indicator that is derived from the at least one safety integrity level, or the at least one functional safety indicator, wherein the communication requirement includes a transmission timing requirement for the functional safety containers, and wherein the transmission is performed, based on the determining, with a timing that is set according to the transmission timing requirement of the at least one communication requirement; and (II) in the use of the apparatus, the apparatus receives at least one communication failure message indicating a failure associated with the transmission of at least one of the plurality of functional safety containers and/or associated with the transmission of the at least one of the plurality of functional safety indicators.

* * * * *